(12) United States Patent
Sheridan et al.

(10) Patent No.: US 10,316,745 B2
(45) Date of Patent: Jun. 11, 2019

(54) TURBOMACHINE FAN CLUTCH

(71) Applicant: United Technologies Corporation, Hartford, CT (US)

(72) Inventors: William G. Sheridan, Southington, CT (US); Michael E. McCune, Colchester, CT (US)

(73) Assignee: United Technologies Corporation, Farmington, CT (US)

(*) Notice: Subject to any disclaimer, the term of this patent is extended or adjusted under 35 U.S.C. 154(b) by 652 days.

(21) Appl. No.: 14/769,887

(22) PCT Filed: Jan. 31, 2014

(86) PCT No.: PCT/US2014/014120
§ 371 (c)(1),
(2) Date: Aug. 24, 2015

(87) PCT Pub. No.: WO2014/133713
PCT Pub. Date: Sep. 4, 2014

(65) Prior Publication Data
US 2016/0003143 A1    Jan. 7, 2016

Related U.S. Application Data

(60) Provisional application No. 61/769,263, filed on Feb. 26, 2013.

(51) Int. Cl.
*F02C 3/107* (2006.01)
*F02C 7/36* (2006.01)
(Continued)

(52) U.S. Cl.
CPC ............... *F02C 3/107* (2013.01); *F02C 7/36* (2013.01); *F16D 41/088* (2013.01); *F16D 43/06* (2013.01); *F05D 2260/4023* (2013.01)

(58) Field of Classification Search
CPC .... F02C 3/107; F02C 7/36; F05D 2260/4023; F05D 41/088; F05D 43/06; B64D 35/00
(Continued)

(56) References Cited

U.S. PATENT DOCUMENTS 2,951,540 A    9/1960  Hawkins
3,227,176 A    1/1966  Luebering et al.
(Continued)

FOREIGN PATENT DOCUMENTS

CH    270945    9/1950
WO    2011162845    12/2011

OTHER PUBLICATIONS

Supplementary European Search Report for Application No. 14757220.0 dated Oct. 7, 2016.
(Continued)

*Primary Examiner* — Mark A Laurenzi
*Assistant Examiner* — Paul W Thiede
(74) *Attorney, Agent, or Firm* — Carlson, Gaskey & Olds, P.C.

(57) ABSTRACT

A gas turbine engine assembly includes, among other things, a clutch configured to move from a first position to a second position in response to rotation of a gas turbine engine fan at a speed greater than a threshold speed. Whether the clutch is in the first position or the second position, the clutch permits rotation of the gas turbine engine fan in a first direction. When the clutch is in the first position, the clutch limits rotation of the gas turbine engine fan only in an opposite, second direction. The clutch is disposed within a compartment that is accessible and removable via removal of an aft engine cover structure. The clutch is removable on-wing.

20 Claims, 5 Drawing Sheets

(51) Int. Cl.
*F16D 41/08* (2006.01)
*F16D 43/16* (2006.01)
*F16D 43/06* (2006.01)

(58) Field of Classification Search
USPC .......................................... 415/123; 188/187
See application file for complete search history.

(56) References Cited

U.S. PATENT DOCUMENTS

| | | | |
|---|---|---|---|
| 3,380,564 A | 4/1968 | Beurer | |
| 3,779,665 A | 12/1973 | Tatem, Jr. et al. | |
| 4,047,842 A * | 9/1977 | Avena | F01D 7/00 |
| | | | 416/152 |
| 4,474,531 A | 10/1984 | Weiss | |
| 4,531,620 A | 7/1985 | Stone | |
| 4,799,354 A * | 1/1989 | Midgley | F02C 7/26 |
| | | | 416/32 |
| 5,029,439 A | 7/1991 | Berneuil et al. | |
| 6,079,200 A | 6/2000 | Tubbs | |
| 6,312,215 B1 | 11/2001 | Walker | |
| 6,638,006 B2 | 10/2003 | Selby | |
| 7,841,163 B2 | 11/2010 | Welch et al. | |
| 7,849,668 B2 | 12/2010 | Sheridan | |
| 2006/0137355 A1 | 6/2006 | Welch et al. | |
| 2007/0289310 A1 | 12/2007 | Dooley et al. | |
| 2009/0208334 A1 | 8/2009 | Vettese et al. | |
| 2010/0029457 A1 | 2/2010 | Carr | |
| 2010/0212281 A1 | 8/2010 | Sheridan | |
| 2013/0195603 A1 * | 8/2013 | Sheridan | F04D 25/02 |
| | | | 415/1 |

OTHER PUBLICATIONS

International Preliminary Report on Patentability for PCT Application No. PCT/US2014/014120, dated Sep. 11, 2015.
U.S. Appl. No. 13/359,552, filed Jan. 27, 2012.
International Search Report and Written Opinion for International Application No. PCT/US2014/014120 completed on May 20, 2014.

* cited by examiner

TURBOMACHINE FAN CLUTCH

BACKGROUND

This disclosure relates to a clutch and, more particularly, to a mechanical clutch that limits relatively high-speed, unlubricated gas turbine engine fan operation.

Turbomachines, such as gas turbine engines, typically include a fan, a turbine section, a compressor section, and a combustor section. Turbomachines may employ a geared architecture connecting the fan and the turbine section.

Air moving through a non-operating gas turbine engine may rotate (i.e., windmill) the fan of the gas turbine engine. In some examples, the gas turbine engine is one of a group of engines that propels an aircraft during flight, and windmilling occurs if the gas turbine engine shuts down during flight. In other examples, wind moving though a gas turbine engine parked on the ground causes windmilling. Gas turbine engines include complex systems that lubricate the fan when windmilling.

SUMMARY

A gas turbine engine assembly according to an example embodiment of the present disclosure includes, among other things, a clutch configured to move from a first position to a second position in response to rotation of a gas turbine engine fan at a speed greater than a threshold speed. Whether the clutch is in the first position or the second position, the clutch permits rotation of the gas turbine engine fan in a first direction. When the clutch is in the first position, the clutch limits rotation of the gas turbine engine fan only in an opposite, second direction. The clutch is disposed within a compartment that is accessible and removable via removal of an aft engine cover structure. The clutch is removable on-wing.

In a further non-limiting embodiment of the foregoing gas turbine engine assembly, the aft engine cover structure includes an engine exhaust cone.

In a further non-limiting embodiment of either of the foregoing gas turbine engine assemblies, the clutch is disposed within an aft bearing compartment and the aft engine cover structure further includes an aft bearing compartment cover plate, disposed axially inward of the exhaust cone. In a further non-limiting embodiment of any of foregoing gas turbine engine assemblies, the clutch is positioned within a gas turbine engine such that the clutch can be moved from an installed position within the gas turbine engine to an uninstalled position without removing any blades from the gas turbine engine.

In a further non-limiting embodiment of any of foregoing gas turbine engine assemblies, the clutch is coupled to a low speed spool of a gas turbine engine.

In a further non-limiting embodiment of any of foregoing gas turbine engine assemblies, the low speed spool is rotatably coupled to the gas turbine engine fan via a geared architecture.

In a further non-limiting embodiment of any of foregoing gas turbine engine assemblies, the clutch is positioned within a gas turbine engine aft the geared architecture relative to a direction of flow through the gas turbine engine.

In a further non-limiting embodiment of any of foregoing gas turbine engine assemblies, the threshold speed is less than an idling speed.

In a further non-limiting embodiment of any of foregoing gas turbine engine assemblies, the threshold speed is a threshold rotational speed of the fan.

In a further non-limiting embodiment of any of foregoing gas turbine engine assemblies, the clutch is an entirely mechanical clutch.

A gas turbine engine assembly according to another example embodiment of the present disclosure includes, among other things, a fan, a spool configured to rotatably drive the fan through a geared architecture, and a clutch coupled to the spool, the clutch moveable between a first position that permits windmilling rotations of the fan, and a second position that limits windmilling rotations of the fan in one direction. The clutch is a mechanical clutch. The clutch is disposed within a compartment that is accessible and removable via removal of an aft engine cover structure. The clutch is removable on-wing.

In a further non-limiting embodiment of the foregoing gas turbine engine assembly, the aft engine cover structure includes an engine exhaust cone.

In a further non-limiting embodiment of either of the foregoing gas turbine engine assemblies, the clutch is disposed within an aft bearing compartment and the aft engine cover structure further includes an aft bearing compartment cover plate, disposed axially inward of the exhaust cone.

In a further non-limiting embodiment of either of the foregoing gas turbine engine assemblies, the clutch is positioned aft the geared architecture relative to a direction of flow through the gas turbine engine.

In a further non-limiting embodiment of either of the foregoing gas turbine engine assemblies, the spool is a low speed spool.

A method of controlling rotation of a gas turbine engine fan according to an exemplary aspect of the present disclosure includes, among other things, engaging a clutch to prevent rotation of a gas turbine engine fan in a first direction when a rotational speed of the gas turbine engine fan is below a threshold speed, the clutch being removable on-wing, and disengaging the clutch when the rotational speed of the gas turbine engine fan meets or exceeds the threshold speed. The clutch disposed within a compartment that is accessible and removable via removal of an aft engine cover structure. The clutch is removable on-wing.

In a further non-limiting of the foregoing method, the aft engine cover structure includes an engine exhaust cone.

In a further non-limiting embodiment of either of the foregoing methods, the clutch is disposed within an aft bearing compartment and the aft engine cover structure further includes an aft bearing compartment cover plate, disposed axially inward of the exhaust cone.

In a further non-limiting embodiment of any of the foregoing methods, the method includes positioning the clutch within a gas turbine engine such that the clutch can be moved from an installed position within the gas turbine engine to an uninstalled position without removing any blades from the gas turbine engine.

In a further non-limiting embodiment of any of the foregoing methods, the method includes coupling the clutch to a spool of a gas turbine engine that rotatably drives the gas turbine engine fan through a geared architecture.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
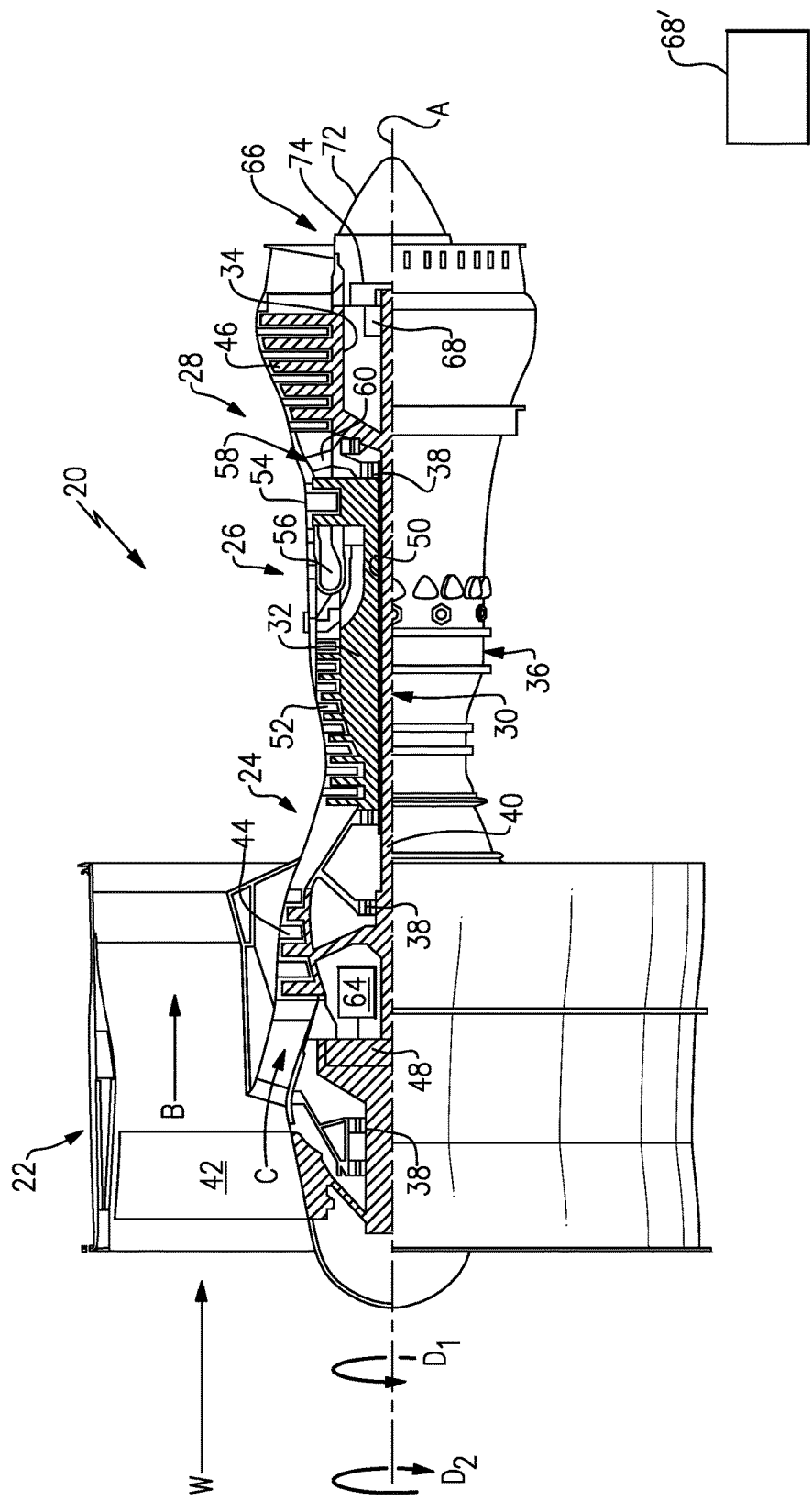
FIG. 1 shows a partial section view of an example gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

To facilitate discussion of the engine, the fan and gear architecture are often referred to as the engine propulsor. The compressor section, combustor and turbine section, on the other hand, are often referred to as the gas generator. However, other component groupings and monikers may be utilized without limiting the nature or scope of the disclosed embodiments.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram °R)/(518.7°R)] 0.5. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The use of the gear reduction between the low speed spool 30 and the fan 42 allows an increase of speed to the low pressure turbine 46. In the past, the speed of the low pressure turbine 46 and the low pressure compressor 44 has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the speeds of the low pressure turbine 46 and the low pressure compressor 44 speeds caused by a desire to not have unduly high fan speeds.

During typical operation of the engine 20, a pump 64 delivers a lubricant (e.g., oil) to the fan 42 and other areas of the engine 20, such as the geared architecture 48. When the engine 20 operates, the fan 42 rotates around the axis A in a direction $D_1$. The lubricant lubricates the fan 42, the geared architecture 48, etc.

The example pump 64 is powered by rotations of the fan 42 in the direction $D_1$. If the rotations in the direction $D_1$ are fast enough, the pump 64 delivers lubricant. Relatively low-speed rotations may not provide enough force to power the pump 64. However, these low-speed rotations do not typically require much, if any, lubricant. Windmilling rotations caused by winds that are less than 25 miles per hour (10 kilometers per hour) are considered low-speed rotations in one example.

Notably, operating the engine 20 is not required to power the pump 64. For example, the fan 42 may power the pump 64 when the fan 42 is windmilling. Windmilling, as is known, refers to rotations of the fan 42 that are not due to engine operations. In one example, the engine 20 is secured to a parked aircraft, and the engine 20 is exposed to wind W. The wind W causes the fan 42 to windmill.

Rotations of the fan 42 in a direction $D_2$, which is opposite the direction $D_1$, do not cause the pump 64 to deliver lubricant. In one example, rotation in the direction $D_2$ does not cause the pump 64 to deliver lubricant because rotation in the direction $D_2$ runs the pump 64 in a reverse direction.

Unlubricated rotations can damage the fan 42, the geared architecture 48, etc., especially if these rotations are high-speed rotations. Accordingly, the example engine 20 includes a clutch assembly 68 that limits rotation of the fan 42 in the direction $D_2$. The clutch assembly 68 is an exemplary gas turbine engine assembly.

As known, when blades or vanes need to be removed from an engine, the engine typically must be removed from the wing. Accordingly, components of the engine that can only be accessed if blades or vanes are removed are not components that can be maintained or repaired while the engine is on-wing.

The example clutch assembly 68 is removeable with the engine 20 mounted on-wing. That is, the clutch assembly 68 can be moved from an installed position within the engine 20 to an uninstalled position 68' without removing any blades internal to the engine 20, or without removing any vanes internal to the engine 20. The clutch assembly 68 can be maintained with the engine 20 mounted on-wing and without removing the entire engine 20 from pylon mounts of the aircraft wing. In this example, the clutch assembly 68 is accessible for maintenance after removing an exhaust cone 72 and an aft bearing compartment cover 74.

In this example, the clutch 68 is coupled to the low speed spool 30 of the engine 20. The clutch 68 selectively limits rotations of the low speed spool 30 to limit rotations of the fan 42. Limiting the rotations of the low speed spool 30 requires less holding torque than directly limiting rotations of the fan 42, due to the geared architecture 48 stepping down the rotational speed of the fan 42 relative to the low speed spool 30. Since the clutch 68 is coupled to the low speed spool 30 rather than directly to the fan 42, a smaller clutch can be used.

The example clutch 68 is positioned within the engine 20 aft the geared architecture 48 relative to a direction of flow through the engine 20. Specifically, the example clutch 68 is located in a rear bearing compartment 66 of the engine 20. The clutch 68 may be located in other areas of the engine 20 in other examples.

Figure 2A:
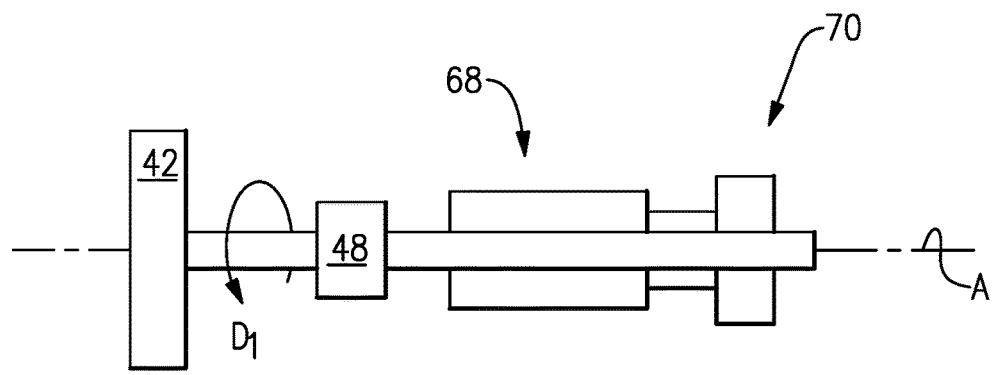
FIG. 2A shows a schematic view of a clutch assembly of the FIG. 1 gas turbine engine in a first position.
Figure 2B:
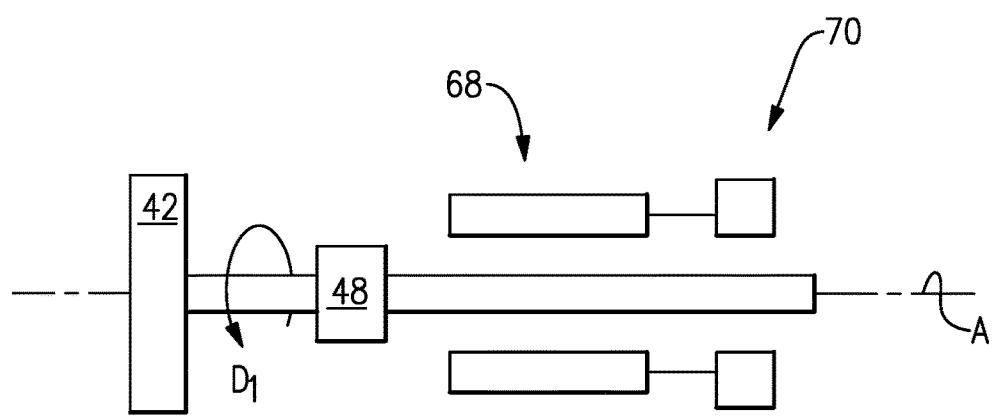
FIG. 2B shows the FIG. 2A clutch in a second position.

The example clutch assembly 68 moves between a first position shown in FIG. 2A and a second position shown in FIG. 2B. The clutch assembly 68 is in the first position when the fan 42 is not rotating, or when the fan 42 is rotating at a rotational speed less than a threshold speed. The fan 42 and the low speed spool 30 are rotatably coupled to each other. In the first position, the clutch assembly 68 blocks rotation of the low speed spool 30 to block rotation of the fan 42 in the direction $D_2$. The clutch assembly 68 thus ensures any windmilling rotations of the fan 42 are in a direction suitable for powering the pump 64. The clutch assembly 68 moves to the second position when the fan 42 rotates at speeds above the threshold speed.

In one example, the threshold speed corresponds to rotations of the fan 42 when wind moves at 25 miles per hour (40 kilometers per hour) through the engine fan section 22. A rotational speed of the fan 42 exceed the threshold speed when the speed of the wind though the fan section 22 is greater than 25 miles per hour (40 kilometers per hour).

In the second position, the clutch assembly 68 is disengaged. The clutch assembly 68 offers very little resistance to rotation when the clutch assembly 68 is in the second position. Because there is very little resistance, the clutch assembly 68 is not significantly worn when the clutch assembly 68 is in the second position, which increases the useful life of the clutch assembly 68.

As can be appreciated, rotations of the fan 42 above the threshold speed are always in the direction $D_1$. The threshold speed is typically set below an idle speed of the engine 20 to ensure that the clutch assembly 68 is always in the second position when the engine 20 is idling.

An actuation assembly 70 controls movement of the clutch assembly 68 between the first position and the second position. The example actuation assembly 70 (and the clutch assembly 68) are mechanical devices. That is no wiring or electrical signals are required to move the clutch assembly 68 between the first position and the second position. That is, the actuation assembly 70 is driven exclusively by centrifugal force and the mechanical action of levers and springs. No outside energy source, such as electrical or hydraulic motors, are required to actuate the mechanism other than mechanical rotation of the fan 42. On the other hand, in some other examples, the actuation assembly, the clutch assembly, or both, may incorporate non-mechanical devices. Such non-mechanical devices include, for example, electronic, electromechanical, and/or hydraulic assemblies or components thereof, as would be appreciated by one of ordinary skill reading the present disclosure.

Many types of clutches are suitable for use in the clutch assembly 68. FIGS. 3A-4B show an example ramp/roller clutch 78 for use in the clutch assembly 68 of FIGS. 2A-2B. The clutch 78 includes many features of the clutch described in U.S. Pat. No. 4,531,620, the contents of which are incorporated herein by reference.

Figure 3A:
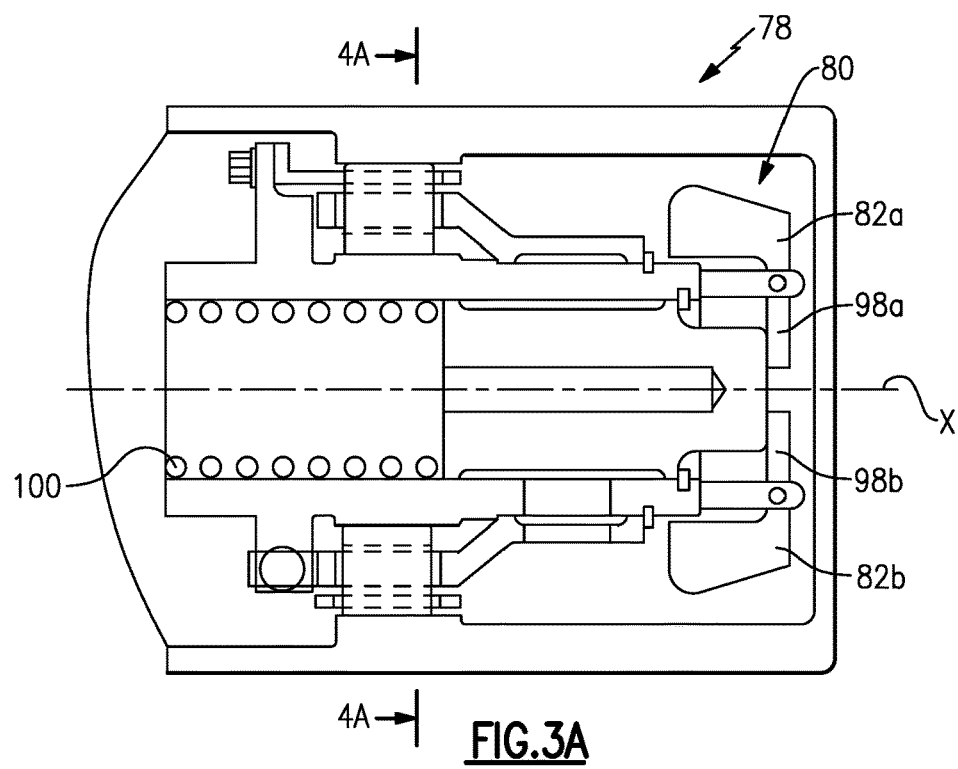
FIG. 3A shows an axial section view of an example gas turbine engine clutch in a first position.
Figure 3B:
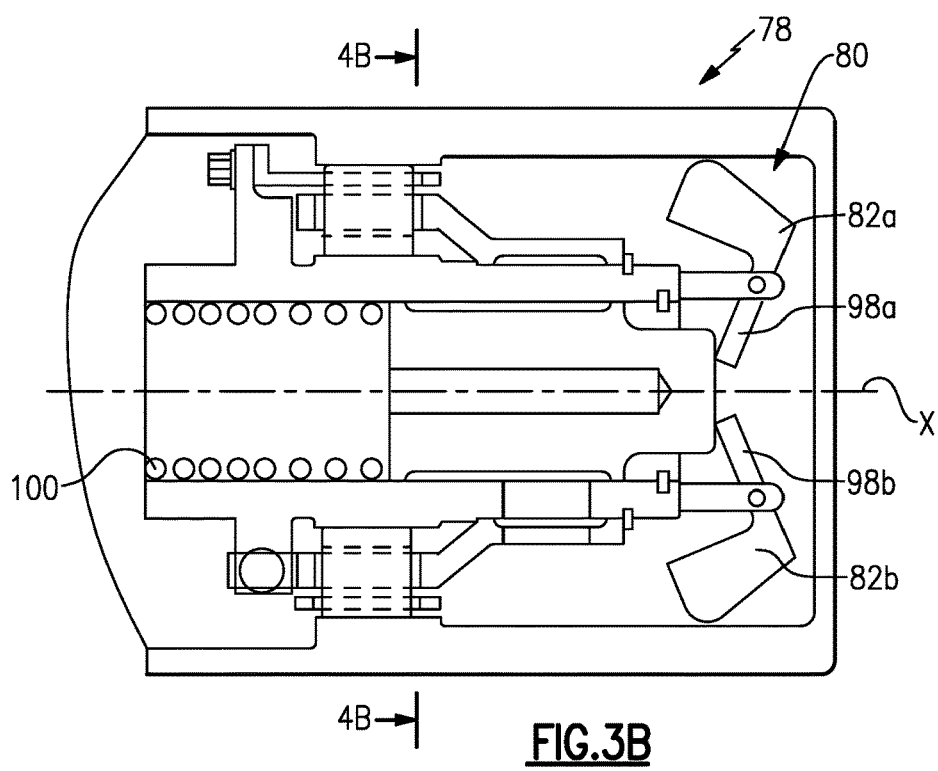
FIG. 3B shows the FIG. 3A gas turbine engine clutch in a second position.
Figure 4A:
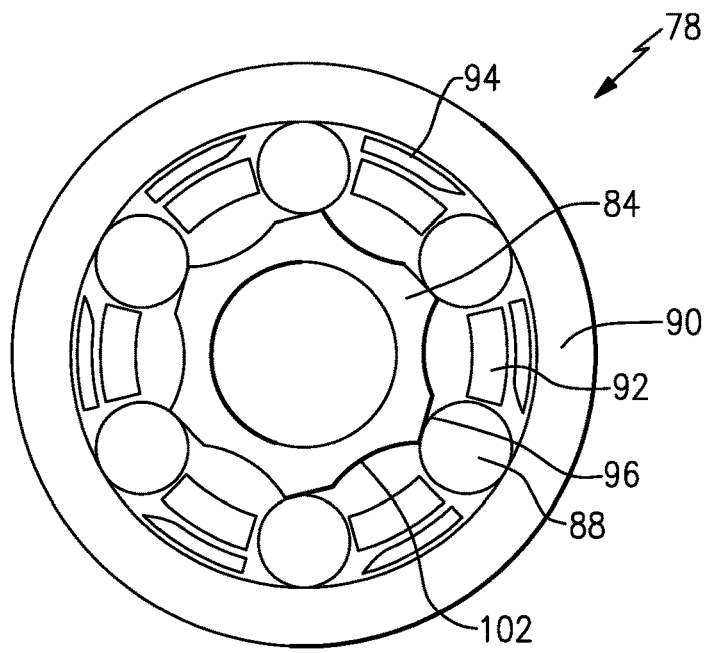
FIG. 4A shows a section view at line 4A-4A in FIG. 3A.
Figure 4B:
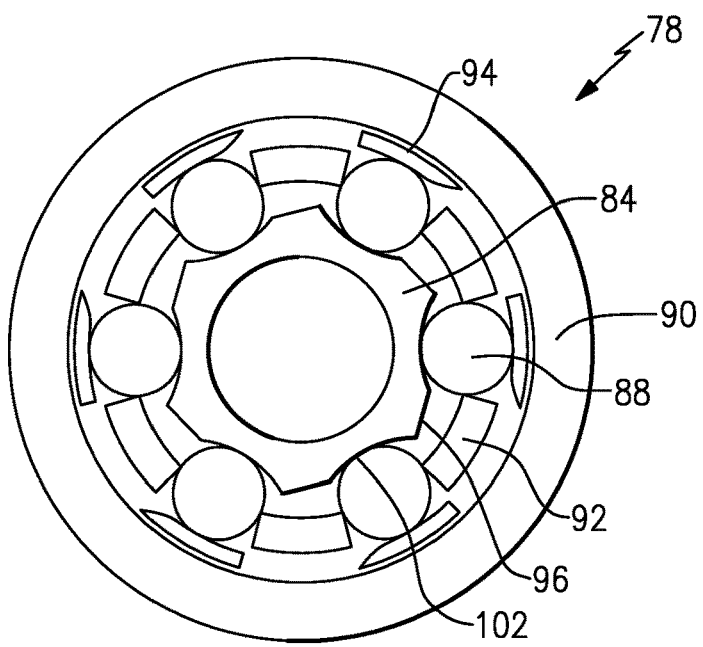
FIG. 4B shows a section view at line 4B-4B in FIG. 3B.

The clutch 78 is shown in the first position in FIGS. 3A and 4A. The clutch 78 is shown in the second position in FIGS. 3B and 4B.

In this example, an actuator 80 includes a pair of centrifugal weights 82a and 82b that rotate with portions of the clutch 78 around an axis X. When the clutch 78 is used within the engine 20, the axis X may or may not be coaxial with the axis A of the engine 20.

The weights 82a and 82b rotate together with the fan 42. The weights 82a and 82b are biased radially inward to a position that holds the clutch 78 in the first position.

When the fan 42 rotates in the direction $D_1$ faster than the threshold speed, the centrifugal force on the weights 82a and 82b exceeds the biasing force and the weights 82a and 82b are cast radially outward away from the axis X. As will be explained in more detail, this radial movement of the weights 82a and 82b causes the clutch 78 to move from the first position to the second position.

When the rotation of the fan 42 no longer exceeds the threshold speed, the weights 82a and 82b move back toward the axis X, which moves the clutch 78 back to the first position.

The clutch 78 includes a shaft 84 that is coupled in rotation together with the low speed spool 30. When the clutch 78 is in the first position, rollers 88 contact a housing 90. When the clutch 78 is in the first position, the rollers 88, an inner cage 92 and an outer cage 94 rotate together relative to the housing 90 in a clockwise direction. In this example, the housing 90 is mounted to a fixed bearing support or an engine static structure. In this example, the shaft 84 is an inner shaft, and the housing 90 is an outer cylindrical shaft.

Rotating the low speed spool 30 and the shaft 84 in the counter-clockwise direction causes the rollers 88 to bind between ramped surfaces 96 of the shaft 84 and the cylindrical housing 90. Thus, when the clutch 78 is in the first position, the low speed spool 30 and the fan 42 are only rotatable in one direction.

When the rotations of the first shaft 84 in a clockwise direction exceed the threshold speed, the weights 82a and 82b are thrown radially outward due to centrifugal force. The radial movement of the weights 82a and 82b pivots arms 98a and 98b, respectively. The arms 98a and 98b move the inner cage 92 axially against a biasing force provided by a spring 100. The inner cage 92 rotates with respect to the shaft 84 when moved axially, which permits the rollers 88 to move circumferentially relative to the shaft 84 and move into recessed areas 102. When the rollers 88 are in the recessed areas 102, the rollers 88 are radially spaced from the housing 90. A circumferential spring (not shown) may encourage this movement.

Relative rotation of the inner cage 92 thus permits the rollers 88 to disengage from the housing 90 and move radially inward to a position within an outer cage 94. The clutch 78 is then considered to have moved to the second position.

Again, in the second position, the rollers 88 are radially spaced from the housing 90. The outer cage 94 is also radially spaced from the housing 90. The resulting clearance between the housing 90 and these portions of the clutch 78 enables the shaft 84 to freely rotate with little, if any, resistance from the rollers 88, or other portions of the clutch 78. Since none of these parts contact each other, little, if any, wear occurs when the clutch 78 is in the second position. When the rotational speed of the shaft 84 decreases, the circumferential force holding the weights 82a and 82b decreases. The spring 100 is then able to move the inner cage 92 back to a position that holds the rollers 88 radially against the housing 90, i.e., the first position.

Figure 5:
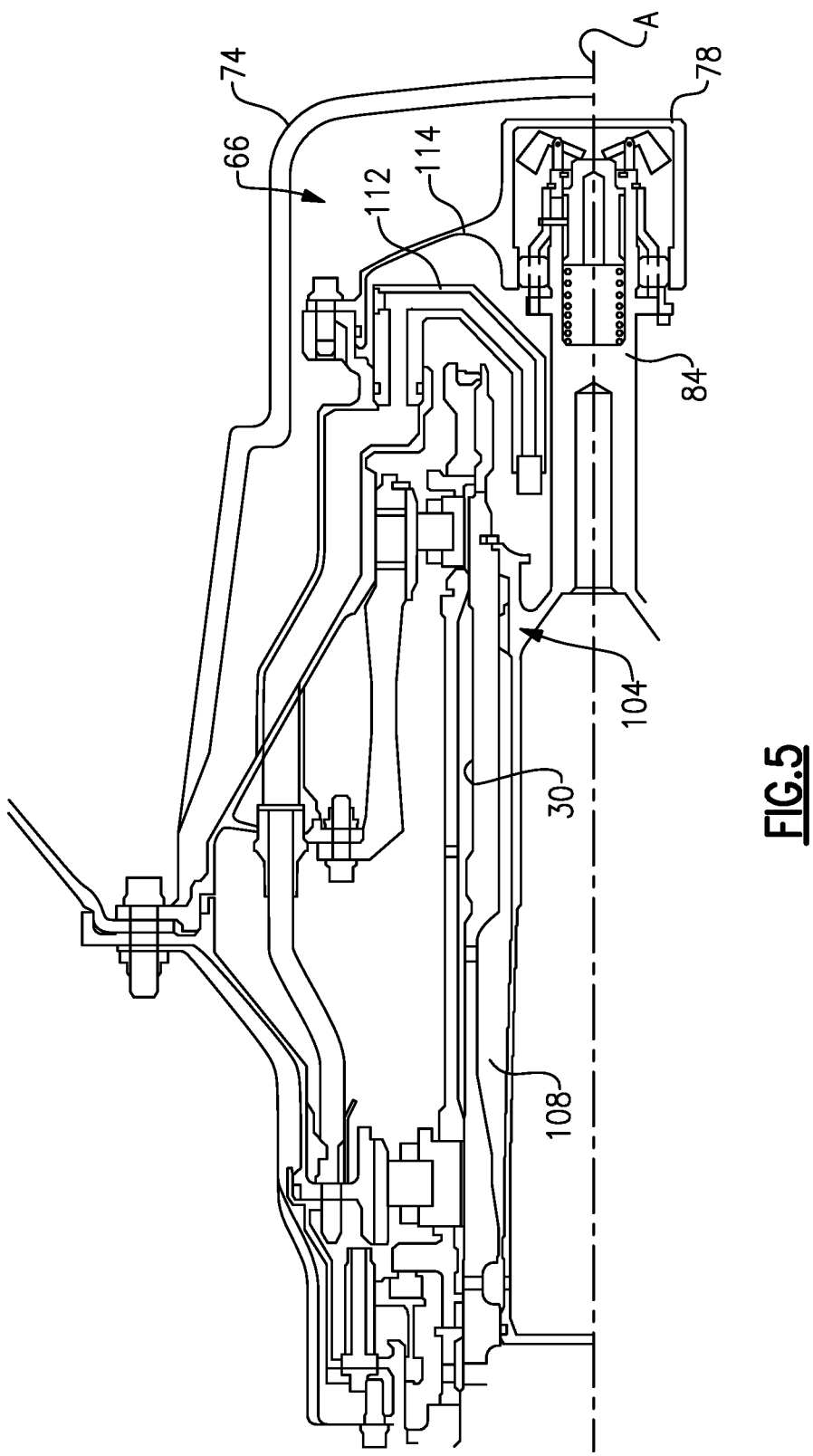
FIG. 5 shows an aft bearing compartment of the example gas turbine engine.

Referring to FIG. 5, the example clutch 78 may be located within a compartment, such as an aft bearing compartment 66 of the engine 20. The aft bearing compartment cover plate 74 directly houses the clutch 78. The aft bearing compartment cover plate 74 is disposed axially inward of the exhaust cone 72. The exhaust cone 72 and the aft bearing compartment cover plate 74 are types of aft engine covers. In this example, the exhaust cone 72 and the aft bearing compartment cover plate 74 together provide an aft engine cover structure. The aft bearing compartment 66 is accessible and removable via removal of the aft engine cover structure.

The shaft 84 of the clutch 78 extends to connect to the low speed spool 30 via a splined connection 104. The shaft 84 includes a lubrication distributor and scoop 108. A lubricant nozzle 112 communicates lubricant to the scoop 108.

The clutch 78 is secured within the compartment 66 using a relatively flexible support 114, which allows the clutch 78 to center on the axis A, particularly at low speeds. Notably, the clutch 68 positioned within the bearing compartment 66 can be removed when the engine 20 is on-wing by removing the exhaust cone 72 (FIG. 1) and aft bearing compartment cover plate 74.

Features of the disclosed examples include a clutch experiencing very little wear at rotational speeds above a threshold speed.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A gas turbine engine assembly, comprising:
    a clutch configured to move from a first position to a second position in response to rotation of a gas turbine engine fan at a speed greater than a threshold speed, wherein, whether the clutch is in the first position or the second position, the clutch is configured to permit rotation of the gas turbine engine fan in a first direction, and when the clutch is in the first position, the clutch is configured to limit rotation of the gas turbine engine fan only in an opposite, second direction,
    the clutch is disposed within a compartment that is accessible via removal of an aft engine cover structure, the clutch is removable on-wing.

2. The gas turbine engine assembly of claim 1, wherein the aft engine cover structure includes an engine exhaust cone.

3. The gas turbine engine assembly of claim 2, wherein the compartment is an aft bearing compartment, the clutch is disposed within the aft bearing compartment and the aft engine cover structure further includes an aft bearing compartment cover plate, disposed axially inward of the exhaust cone.

4. The gas turbine engine assembly of claim 1, further comprising a gas turbine engine including the clutch, wherein the clutch is positioned within the gas turbine engine such that the clutch can be moved from an installed position within the gas turbine engine to an uninstalled position without removing any blades from the gas turbine engine.

5. The gas turbine engine assembly of claim 1, further comprising a gas turbine engine including the clutch, wherein the clutch is coupled to a low speed spool of the gas turbine engine.

6. The gas turbine engine assembly of claim 5, wherein the low speed spool is rotatably coupled to the gas turbine engine fan via a geared architecture.

7. The gas turbine engine assembly of claim 6, wherein the clutch is positioned within the gas turbine engine aft the geared architecture relative to a direction of flow through the gas turbine engine.

8. The gas turbine engine assembly of claim 1, wherein the threshold speed is less than an idling speed of the gas turbine engine fan.

9. The gas turbine engine assembly of claim 1, wherein the threshold speed is a threshold rotational speed of the gas turbine engine fan.

10. The gas turbine engine assembly of claim 1, wherein the clutch is a mechanical clutch.

11. A gas turbine engine assembly, comprising:
a fan;
a spool configured to rotatably drive the fan through a geared architecture; and
a clutch coupled to the spool, the clutch moveable between a first position that permits windmilling rotations of the fan, and a second position that limits windmilling rotations of the fan in one direction, the clutch moveable from the first position to the second position in response to rotation of the fan at a speed greater than a threshold speed, wherein the clutch is a mechanical clutch, the clutch is disposed within a compartment that is accessible via removal of an aft engine cover structure, the clutch is removable on-wing.

12. The gas turbine engine assembly of claim 11, wherein the aft engine cover structure includes an engine exhaust cone.

13. The gas turbine engine assembly of claim 12, wherein the compartment is an aft bearing compartment, the clutch is disposed within the aft bearing compartment and the aft engine cover structure further includes an aft bearing compartment cover plate, disposed axially inward of the exhaust cone.

14. The gas turbine engine assembly of claim 11, wherein the clutch is positioned aft of the geared architecture relative to a direction of flow through the gas turbine engine.

15. The gas turbine engine assembly of claim 11, wherein the spool is a low speed spool.

16. A method of controlling rotation of a gas turbine engine fan, comprising:
engaging a clutch to prevent rotation of the gas turbine engine fan in a first direction when a rotational speed of the gas turbine engine fan is below a threshold speed, the clutch being removable on-wing; and
disengaging the clutch when the rotational speed of the gas turbine engine fan meets or exceeds the threshold speed, wherein the clutch is disposed within a compartment that is accessible via removal of an aft engine cover structure.

17. The method of claim 16, wherein the aft engine cover structure includes an engine exhaust cone.

18. The method of claim 17, wherein the compartment is an aft bearing compartment, the clutch is disposed within the aft bearing compartment and the aft engine cover structure further includes an aft bearing compartment cover plate, disposed axially inward of the exhaust cone.

19. The method of claim 16, including positioning the clutch within the gas turbine engine such that the clutch can be moved from an installed position within the gas turbine engine to an uninstalled position without removing any blades from the gas turbine engine.

20. The method of claim 16, including coupling the clutch to a spool of the gas turbine engine that rotatably drives the gas turbine engine fan through a geared architecture.

* * * * *